(No Model.)
J. HORAN.
FLOWER SUPPORT.
No. 587,581. Patented Aug. 3, 1897.
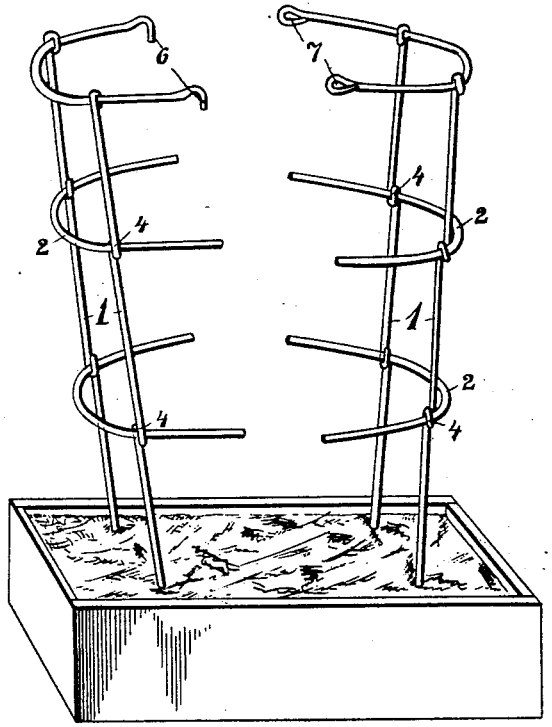
Witnesses
O. Seiffert
J. A. Wilson
Inventor
James Horan.
by H. B. Wilson
Attorney

UNITED STATES PATENT OFFICE.

JAMES HORAN, OF BRIDGEPORT, CONNECTICUT.

FLOWER-SUPPORT.

SPECIFICATION forming part of Letters Patent No. 587,581, dated August 3, 1897.

Application filed April 29, 1897. Serial No. 634,413. (No model.)

*To all whom it may concern:*

Be it known that I, JAMES HORAN, a citizen of the United States, residing at Bridgeport, in the county of Fairfield and State of Connecticut, have invented certain new and useful Improvements in Flower-Supports; and I do declare the following to be a full, clear, and exact description of the invention, such as will enable others skilled in the art to which it appertains to make and use the same.

My invention has relation to devices for supporting growing plants, whereby they are protected from the violence of the wind and the weather in general and are held in an upright position, which serves to train them in their growth.

The invention consists of certain features of construction and combination of parts which will be hereinafter fully set forth and claimed.

In the accompanying drawing, in which I have illustrated the preferred embodiment of my invention, 1 denotes two pairs of spring or wire rods, the rods of each pair being connected by a series of semicircular holders 2, which may be either soldered to the vertical wires or rods or be secured thereto by passing them through eyes 4, formed on the vertical rods, or by twisting them around the rods.

The upper holders are adapted to be connected together, and to this end I provide the ends of one holder with hooks 6 and the ends of the other holder with eyes 7 to receive said hooks.

Before the holders are closed around the plant the upright wires or rods are inclined. When they are sprung toward each other to assume a vertical position, the holders will embrace the plant and serve to support it against the violence of the weather as well as against roaming animals.

The device is exceedingly simple and may be easily applied to the plants, for all that is necessary is to force the lower ends of the vertical wires into the ground and connect the holders at their upper ends, in which position the plant will be perfectly supported.

Although I have specifically described the construction and relative arrangement of the several elements of my invention I do not desire to be confined to the same, as such changes or modifications may be made as clearly fall within the scope of my invention without departing from the spirit thereof.

Having thus described my invention, what I claim, and desire to secure by Letters Patent, is—

A plant-support, consisting of vertical spring-wires provided with coöperating holders, and means for connecting the upper holders together to draw and retain the remaining holders about the plant, substantially as set forth.

In testimony whereof I hereunto affix my signature in presence of two witnesses.

JAMES HORAN.

Witnesses:
NELLIE L. HORAN,
JOHN CULLMAN, Jr.